US012614642B2

(12) United States Patent
Bonnamour et al.

(10) Patent No.: US 12,614,642 B2
(45) Date of Patent: Apr. 28, 2026

(54) NUCLEAR FUEL ASSEMBLY WITH A REINFORCEMENT DEVICE

(71) Applicant: FRAMATOME, Courbevoie (FR)

(72) Inventors: Michel Bonnamour, Lyons (FR); Yassmail Akariouh, Lyons (FR)

(73) Assignee: FRAMATOME, Courbevoie (FR)

( * ) Notice: Subject to any disclaimer, the term of this patent is extended or adjusted under 35 U.S.C. 154(b) by 294 days.

(21) Appl. No.: 17/761,954

(22) PCT Filed: Sep. 23, 2020

(86) PCT No.: PCT/EP2020/076569
§ 371 (c)(1),
(2) Date: Mar. 18, 2022

(87) PCT Pub. No.: WO2021/058565
PCT Pub. Date: Apr. 1, 2021

(65) Prior Publication Data
US 2022/0328201 A1 Oct. 13, 2022

(30) Foreign Application Priority Data
Sep. 24, 2019 (FR) ........................................ 1910509

(51) Int. Cl.
*G21C 3/352* (2006.01)

(52) U.S. Cl.
CPC .................................... *G21C 3/352* (2013.01)

(58) Field of Classification Search
CPC ...... G21C 3/3432; G21C 3/352; G21C 3/356; G21C 3/3563

(Continued)

(56) References Cited

U.S. PATENT DOCUMENTS 5,966,419 A * 10/1999 Petit .................... G21C 3/3566 376/441
2007/0076840 A1 4/2007 Beati et al.
(Continued)

FOREIGN PATENT DOCUMENTS

CN 1315733 A 10/2001
CN 101752015 A 6/2010
(Continued)

OTHER PUBLICATIONS

Search Report of Corresponding FR 19 10509.
Search Report of Corresponding PCT/EP2020/076569.

*Primary Examiner* — Jinney Kil
(74) *Attorney, Agent, or Firm* — Davidson Kappel LLC

(57) ABSTRACT

A nuclear fuel assembly comprises nuclear fuel rods (4) extending along a longitudinal axis (L) and a support skeleton (6) configured to support the nuclear fuel rods (4). The support skeleton (6) includes two end pieces (8, 10), a plurality of guide tubes (12) connecting the end pieces (8, 10) to each other, and spacer grids (14) attached to the guide tubes (12), with each spacer grid (14) supporting the nuclear fuel rods (4). The nuclear fuel assembly further includes at least one reinforcement device (20) comprising at least one reinforcement plate (22) which is in contact with at least two of the guide tubes (12) and attached to one or more of the guide tubes (12) at attachment points (21). Each reinforcement plate (22) has at least two attachment points (21) that are offset relative to each other along the longitudinal axis (L).

17 Claims, 13 Drawing Sheets

(58) Field of Classification Search
USPC .......................... 376/439, 442, 449, 453–454
See application file for complete search history.

(56) References Cited

U.S. PATENT DOCUMENTS

| | | | | |
|---|---|---|---|---|
| 2010/0119031 | A1* | 5/2010 | Harada .................. | G21C 3/334 376/446 |
| 2010/0246747 | A1 | 9/2010 | Gomez et al. | |
| 2011/0255651 | A1 | 10/2011 | Bashkirtsev et al. | |
| 2013/0230133 | A1 | 9/2013 | Yu et al. | |
| 2014/0064434 | A1 | 3/2014 | Martin | |

FOREIGN PATENT DOCUMENTS

| | | | | | |
|---|---|---|---|---|---|
| CN | 101903957 | A | | 12/2010 | |
| CN | 102568632 | A | | 7/2012 | |
| CN | 102105942 | B | | 7/2013 | |
| CN | 103187107 | A | | 7/2013 | |
| CN | 204884578 | U | | 12/2015 | |
| CN | 105869681 | A | | 8/2016 | |
| CN | 105869682 | A | | 8/2016 | |
| EP | 0185219 | B1 | * | 1/1989 | ............. G21C 3/322 |
| EP | 0455847 | B1 | | 7/1994 | |
| FR | 2860334 | A1 | | 4/2005 | |
| FR | 2860335 | A1 | | 12/2008 | |
| FR | 2995124 | A1 | | 3/2014 | |
| KR | 10207564 | B1 | | 7/1999 | |
| KR | 101614698 | B1 | | 4/2016 | |
| KR | 101729155 | B1 | | 4/2017 | |
| KR | 101731915 | B1 | | 5/2017 | |
| KR | 101732174 | B1 | | 5/2017 | |
| KR | 20190089612 | A | * | 7/2019 | |
| RU | 2246142 | C1 | | 2/2005 | |
| RU | 78360 | U1 | | 11/2008 | |

* cited by examiner

NUCLEAR FUEL ASSEMBLY WITH A REINFORCEMENT DEVICE

The present disclosure relates to the field of nuclear fuel assemblies, in particular for pressurized water nuclear reactors (or PWR for "Pressurized Water Reactor").

BACKGROUND

A nuclear fuel assembly for a pressurized water nuclear reactor generally includes a bundle of nuclear fuel rods extending along a longitudinal axis and a support skeleton configured to support the nuclear fuel rods. The support skeleton comprises in particular two end pieces spaced apart longitudinally, a plurality of guide tubes extending along the longitudinal axis by connecting the end pieces to each other, and spacer grids distributed along the guide tubes and attached to the guide tubes, each spacer grid being configured to support the nuclear fuel rods.

Each spacer grid has rod cells through which the nuclear fuel rods traverse, with each rod cell being traversed by one respective nuclear fuel rod, and being provided with springs and/or bosses on the internal surfaces of the rod cell in order to maintain in position transversely and longitudinally, the nuclear fuel rod traversing through this rod cell.

In operation, the nuclear fuel assembly is arranged vertically within the core of a nuclear reactor. In this position, the nuclear fuel assembly may exhibit a tendency to flex along its longitudinal axis, and assume a C-shaped, S-shaped, or W-shaped form.

Such deformations can pose operational problems, for example for the insertion of control clusters within the interior of the guide tubes, and/or maintenance problems, for example for the insertion and/or the extraction of the nuclear fuel assembly, in or out of the nuclear reactor core.

FR2860334A1 and FR2860335A1 disclose nuclear fuel assemblies provided with reinforcement devices attached to the guide tubes of the nuclear fuel assembly, in order to stiffen the support skeleton and thus limit lateral deformations of the nuclear fuel assembly. These reinforcement devices comprise substantially planar plates, plates in the form of an angle section or sets of intersecting plates, the plates being attached onto the guide tubes so as to connect them to each other. These reinforcement devices are provided in addition to the spacer grids.

SUMMARY

One of the objectives of the present disclosure is to provide a nuclear fuel assembly, whereof the rigidity can be enhanced while also limiting the weight of the nuclear fuel assembly and/or the flow resistance to a fluid flowing through the nuclear fuel assembly.

To this end, the present disclosure provides a nuclear fuel assembly comprising nuclear fuel rods extending along a longitudinal axis and a support skeleton configured to bear the nuclear fuel rods, the support skeleton comprising two end pieces spaced apart along the longitudinal axis, a plurality of guide tubes extending along the longitudinal axis and connecting the end pieces to each other, spacer grids distributed between the two end pieces and attached onto the guide tubes, each spacer grid supporting the nuclear fuel rods, the nuclear fuel assembly further comprising at least one reinforcement device, each reinforcement device comprising at least one reinforcement plate, each reinforcement plate being in contact with at least two of the guide tubes and attached to one or more of the guide tubes at attachment points, each reinforcement plate having at least two attachment points that are offset relative to each other along the longitudinal axis.

By providing a reinforcement device having at least one reinforcement plate attached to guide tubes at attachment points that are offset along the guide tubes, it is possible to enhance the rigidity due to the attachment points being offset, while also limiting the material of the reinforcement plate, and therefore its cost and the impact of the reinforcement device on the neutronic performance of the nuclear fuel assembly and/or its flow resistance to a fluid flowing through the nuclear fuel assembly.

According to other features of the assembly according to the present disclosure, considered in isolation or in accordance with any technically conceivable combination:

- at least one said reinforcement plate is attached to a guide tube at two attachment points spaced apart along this guide tube;
- at least one reinforcement plate is attached to each guide tube with which this reinforcement plate is in contact;
- at least one reinforcement plate is attached to only a part of the guide tubes with which this reinforcement plate is in contact;
- at least one reinforcement plate has at least two distinct and separate branches connected together, the at least two branches being each in contact with at least one guide tube at contact points spaced apart from one another along the longitudinal axis;
- each branch of the reinforcement plate has two ends, each end being attached to a respective guide tube;
- the two branches of the reinforcement plate are connected by at least one connector link extending between the two branches;
- the two branches of the reinforcement plate extend parallel to each other;
- the two branches of the reinforcement plate extend perpendicularly relative to the longitudinal axis;
- the assembly comprises at least one reinforcement plate having two branches that are joined at a junction, each branch extending from the junction away from the other branch;
- the two branches of the reinforcement plate are joined at one of their ends and spaced apart at the other of their ends;
- one or each of the two branches of the reinforcement plate extends obliquely in relation to the longitudinal axis;
- the reinforcement device comprises at least one pair of reinforcement plates arranged on either side of an assembly of guide tubes with which the two reinforcement plates are in contact;
- the reinforcement device comprises a plurality of intersecting reinforcement plates;
- the reinforcement device comprises a plurality of pairs of intersecting reinforcement plates;
- at least one reinforcement plate is provided with at least one mixing fin and/or at least one deflector and/or at least one movement limiter;
- each attachment between a reinforcement plate and a guide tube is produced by plastic deformation, in particular by crimping or expansion, by welding and/or by brazing.

BRIEF SUMMARY OF THE DRAWINGS

The present disclosure and its advantages will be better understood upon reading the description which follows, given solely by way of non-limiting example, and with reference made to the appended drawings, in which.

DETAILED DESCRIPTION

Figure 1:
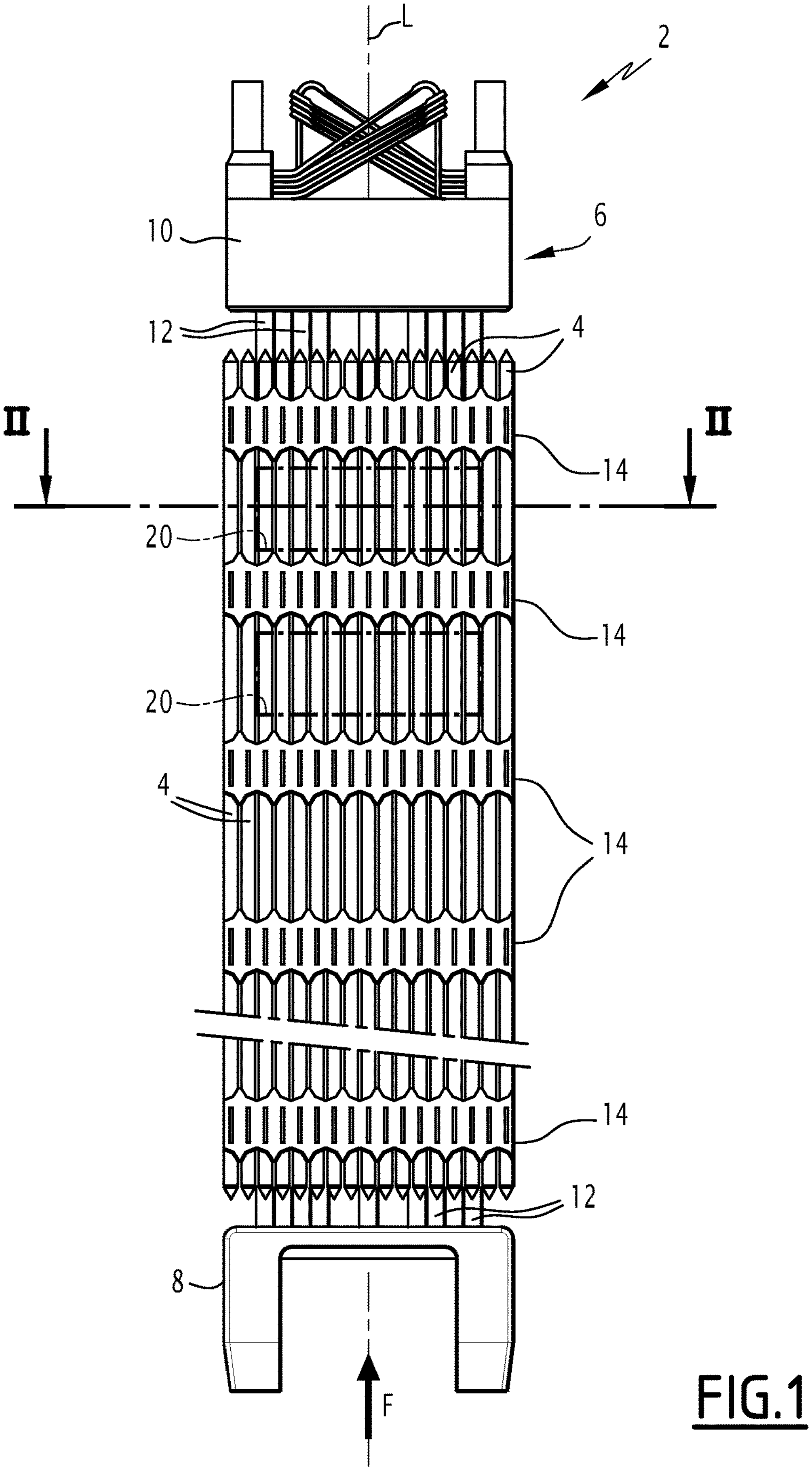
FIG. 1 is a schematic view in elevation of a nuclear fuel assembly.

The nuclear fuel assembly 2 shown in FIG. 1 comprises a bundle of nuclear fuel rods 4 and a support skeleton 6 configured to support the nuclear fuel rods 4.

The nuclear fuel rods 4 extend parallel relative to each other and to a longitudinal axis L. The longitudinal axis L extends vertically when the nuclear fuel assembly 2 is placed in a core of a nuclear reactor. In operation, a coolant fluid flows vertically from the bottom to the top through the nuclear fuel assembly 2 as shown by the arrow F in FIG. 1.

In the remainder of the description, the terms “vertical”, “horizontal”, “top”, “bottom”, “longitudinal”, “transverse”, “upper” and “lower” are to be understood with reference to the position of the nuclear fuel assembly 2 in the core of the nuclear reactor, the longitudinal axis L being substantially vertical.

Figure 2:
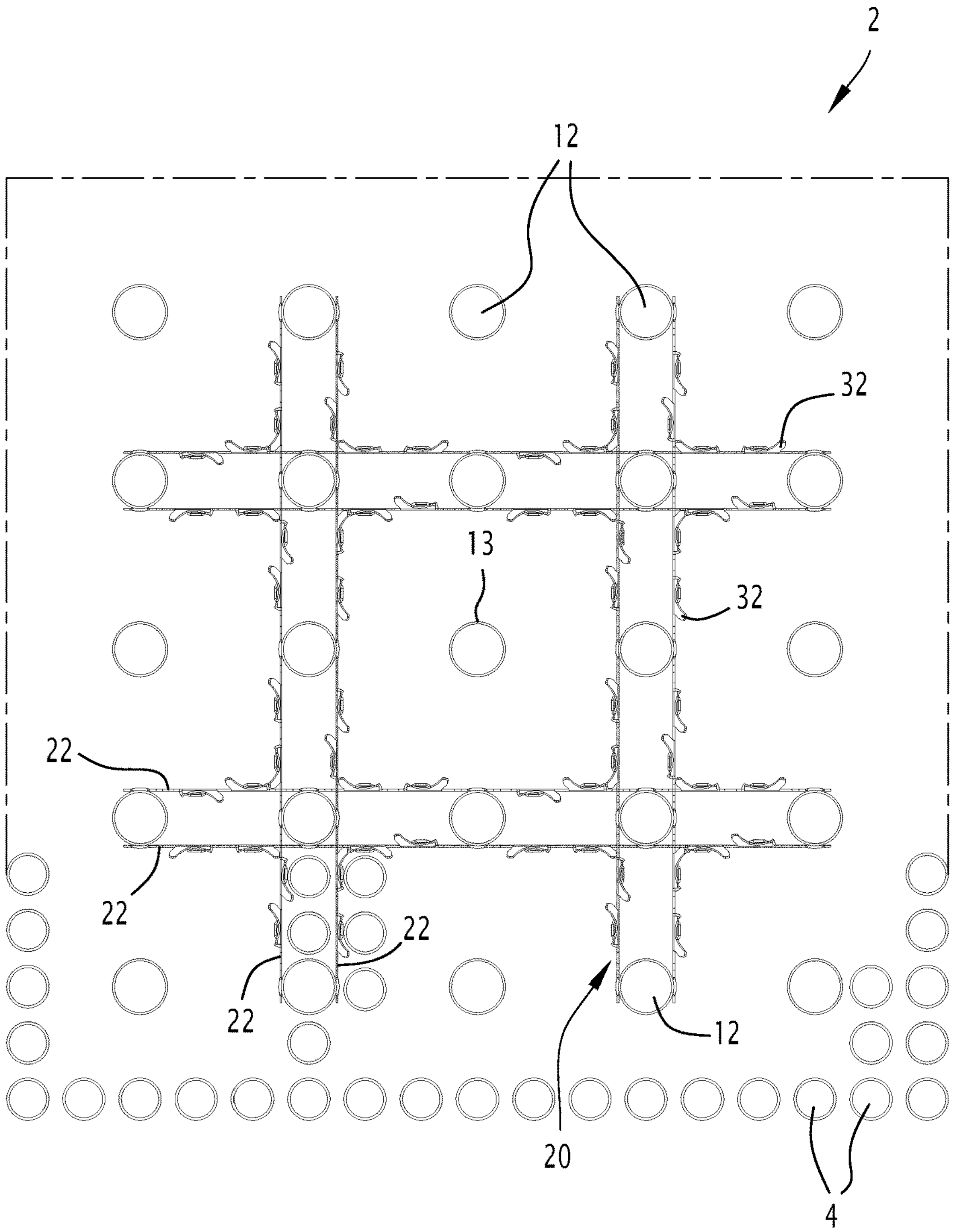
FIG. 2 is a cross-sectional view of the nuclear fuel assembly shown in FIG. 2 along II-II in FIG. 1.

The support skeleton 6 comprises a lower end piece 8, an upper end piece 10, a plurality of guide tubes 12 and a plurality of spacer grids 14. It optionally comprises an instrumentation tube 13 generally arranged in place of a central guide tube 12, as illustrated in FIG. 2.

The lower end piece 8 and the upper end piece 10 are spaced apart along the longitudinal axis L.

The guide tubes 12 are for example metallic.

The guide tubes 12 extend along the longitudinal axis L and connect the lower end piece 8 and the upper end piece 10 to each other, while maintaining the spacing distance between the lower end piece 8 and the upper end piece 10. The nuclear fuel rods 4 are accommodated between the lower end piece 8 and the upper end piece 10.

Each guide tube 12 is open at its upper end to allow for the insertion of a control bar (not shown) into the interior of the guide tube 12, through the upper end piece 10. Such a control bar provides the ability to control the reactivity of the nuclear reactor core within which the nuclear fuel assembly 2 is inserted.

The spacer grids 14 are distributed along the guide tubes 12 while being spaced apart from one another along the longitudinal axis L. Each spacer grid 14 is rigidly attached to the guide tubes 12, with the guide tubes 12 extending through each spacer grid 14.

Each spacer grid 14 is configured to support the nuclear fuel rods 4 by maintaining them in a configuration in which they are spaced apart from one another in the transverse direction. The nuclear fuel rods 4 are preferably maintained in position at the nodes of a substantially regular imaginary network.

Each spacer grid 14 comprises for example a plurality of rod cells, each rod cell being intended to receive a respective nuclear fuel rod 4, the walls of the rod cell being provided with support elements that come into contact with the external surface of the nuclear fuel rod 4 in order to maintain it in position longitudinally and transversely.

The support elements of each rod cell comprise for example at least one elastic spring and/or at least one rigid boss, each spring being for example configured to push the nuclear fuel rod 4 into abutment against one or more bosses.

The nuclear fuel assembly 2 further comprises at least one reinforcement device 20 configured to reinforce the support skeleton 6.

Each reinforcement device 20 is for example metallic.

Each reinforcement device 20 is separate and distinct from the spacer grids 14. Each reinforcement device 20 is provided in addition to the spacer grids 14.

Each reinforcement device 20 is disposed between two successive spacer grids 14, between the lower end piece 8 and one spacer grid 14 or between one spacer grid 14 and the upper end piece 10. In FIG. 1, each reinforcement device 20 is situated between two successive spacer grids 14.

As illustrated in FIG. 2, each reinforcement device 20 is in contact with a plurality of guide tubes 12, whilst in addition, being attached onto one or more of the guide tubes 12 with which it is in contact.

This makes it possible to create an additional connecting link between the guide tubes 12 to which the reinforcement plate 22 is attached, and thus to make the support skeleton 6 rigid, in particular conferring flexural rigidity along the longitudinal axis L.

Each reinforcement device 20 is not attached to the nuclear fuel rods 4. Each reinforcement device 20 does not comprise any attachment points on a nuclear fuel rod 4.

Each reinforcement device 20 is configured to allow for the through-passage of the nuclear fuel rods 4.

Each reinforcement device 20 optionally comprises movement limiters 36, for example in the form of rigid bosses, configured to limit the movement of a nuclear fuel rod 4 towards the reinforcement device 20. Such movement limiters 36 can be seen in FIG. 3.

Preferably, each reinforcement device 20 is disposed within the interior of the bundle of nuclear fuel rods 4.

In particular, each reinforcement device 20 does not extend between a peripheral layer of the nuclear fuel rods 4 and an adjacent layer of the nuclear fuel rods 4.

In other words, as illustrated in FIG. 2, each reinforcement device 20 does not extend between the two layers of nuclear fuel rods 4 that are situated at the exterior-most of the nuclear fuel rod bundle 4.

Figure 3:
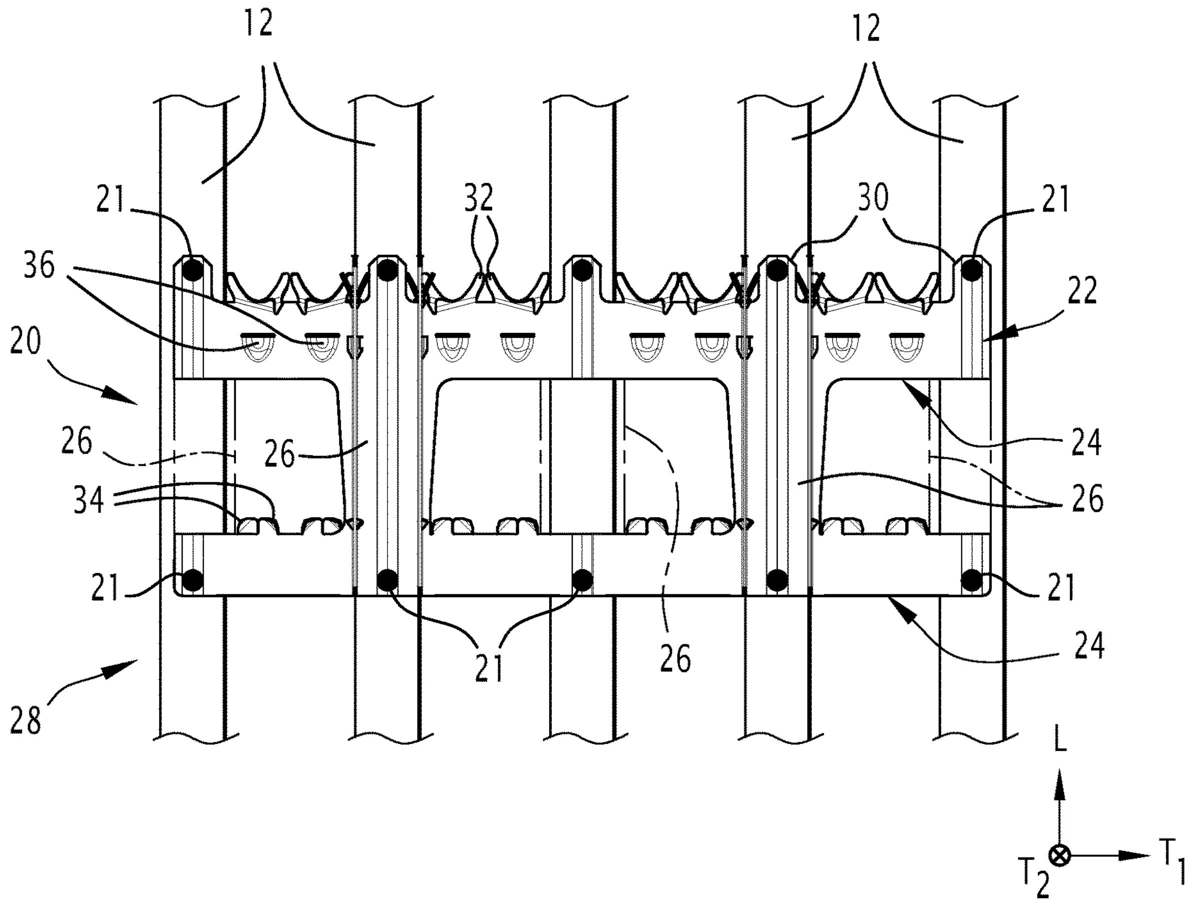
FIG. 3 is a side view illustrating the guide tubes and a reinforcement device of the nuclear fuel assembly of FIG. 1.
Figure 5:
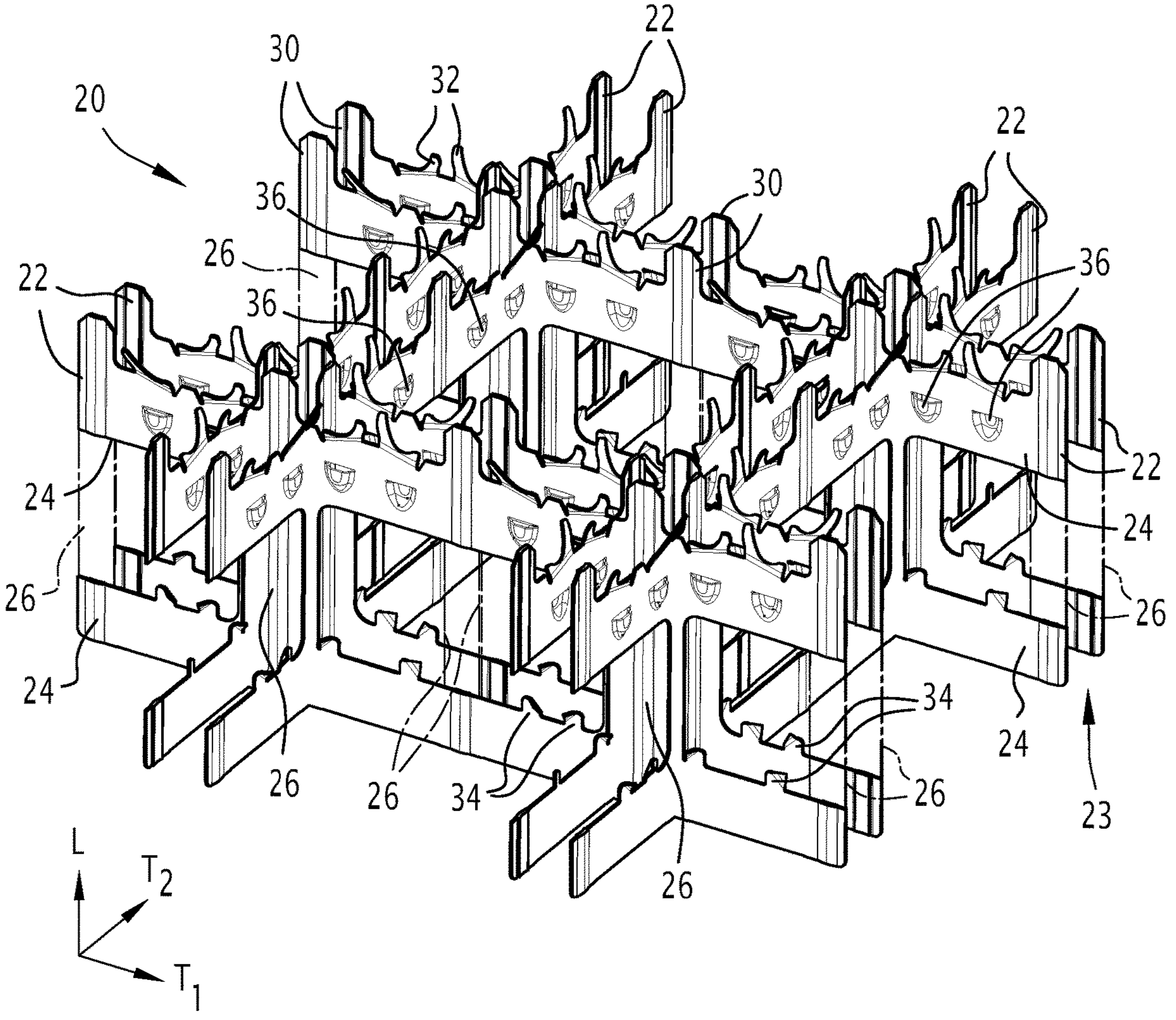
FIG. 5 is a perspective view of the reinforcement device of FIGS. 3 and 4.

As can be more clearly seen in FIGS. 3 and 5, each reinforcement device 20 comprises at least one reinforcement plate 22, each reinforcement plate 22 being in contact with at least two guide tubes 12 and rigidly attached to one or more guide tubes 12 at the attachment points 21.

Each reinforcement plate 22 is for example metallic.

Each reinforcement plate 22 has a plurality of attachment points 21, located on one or more guide tubes 12.

Each reinforcement plate 22 is attached onto only one of the guide tubes 12 with which it is in contact or onto a plurality thereof from among the guide tubes 12 with which it is in contact.

Each reinforcement plate 22 that is attached onto a plurality of guide tubes 12 is attached onto each of the guide tubes 12 with which the reinforcement plate 22 is in contact or on only a part of the guide tubes 12 with which the reinforcement plate 22 is in contact, the reinforcement plate 22 then being in simple contact (without rigid attachment) with at least one of the guide tubes 12 with which it is in contact.

The attachment between each reinforcement plate 22 and each of the guide tubes 12 to which the reinforcement plate 22 is attached is effected by mechanical assembly at the attachment points 21 in order to ensure the reinforcement device 20 is integrally secured with each guide tube 12 to which it is attached.

The mechanical assembly may be direct. The mechanical assembly may be indirect by using, for example, a sleeve positioned around the guide tube 12. The attachment points 21 are preferably permanent and without a degree of freedom. The attachment points 21 may, for example, be produced by plastic deformation (crimping, expansion, etc), by welding or by brazing. In FIG. 3, the attachment points 21 are schematically represented by black dots.

Each reinforcement plate 22 has at least two attachment points 21 which are offset relative to each other along the longitudinal axis L.

Two attachment points 21 offset along the longitudinal axis L are for example two attachment points 21 that are situated on the same given guide tube 12 and spaced apart from one another along this guide tube 12, or two attachment points 21 that are situated on two separate guide tubes 12.

The reinforcement plate 22 may comprise one or more branches 24. Each branch 24 is preferably in contact with at least two guide tubes 12. Each branch is in the form of an elongated strip extending along a direction that is transverse in relation to the longitudinal axis L.

In one exemplary embodiment, as illustrated in FIGS. 3 and 5, each reinforcement plate 22 has at least one branch 24 that is in contact with at least two guide tubes 12 and attached onto at least one of the guide tubes 12 with which the branch 24 is in contact.

Each attachment point 21 for attaching a branch 24 onto the guide tubes 12 constitutes an attachment point 21 for attaching the reinforcement plate 22 onto the guide tubes 12.

Preferably, the reinforcement plate 22 comprises at least one branch 24 which is configured to ensure contact with at least one of the guide tubes 12.

In one exemplary embodiment, the reinforcement plate 22 has at least two distinct branches 24 connected together, each branch 24 being in contact with at least two guide tubes 12.

At least one of the branches 24 is attached onto one of the guide tubes 12 with which it is in contact, and at least one attachment point 21 of the reinforcement plate 22 is located on this branch 24.

In one exemplary embodiment, each of the branches 24 is attached to at least one of the guide tubes 12 on which the reinforcement plate 22 is attached. Each of the branches 24 is therefore provided with at least one attachment point 21.

In a variant, at least one of the branches 24 of the reinforcement plate 22 is not attached to any of the guide tubes 12 on which the reinforcement plate 22 is attached. Such a branch 24 therefore is deprived of attachment point 21.

In this case, preferably, the mechanical clearance between at least one of the guide tubes 12 and the said branch 24 is negative so as to ensure permanent frictional contact between the at least one of the guide tubes 12 and the said branch 24.

Figure 4:
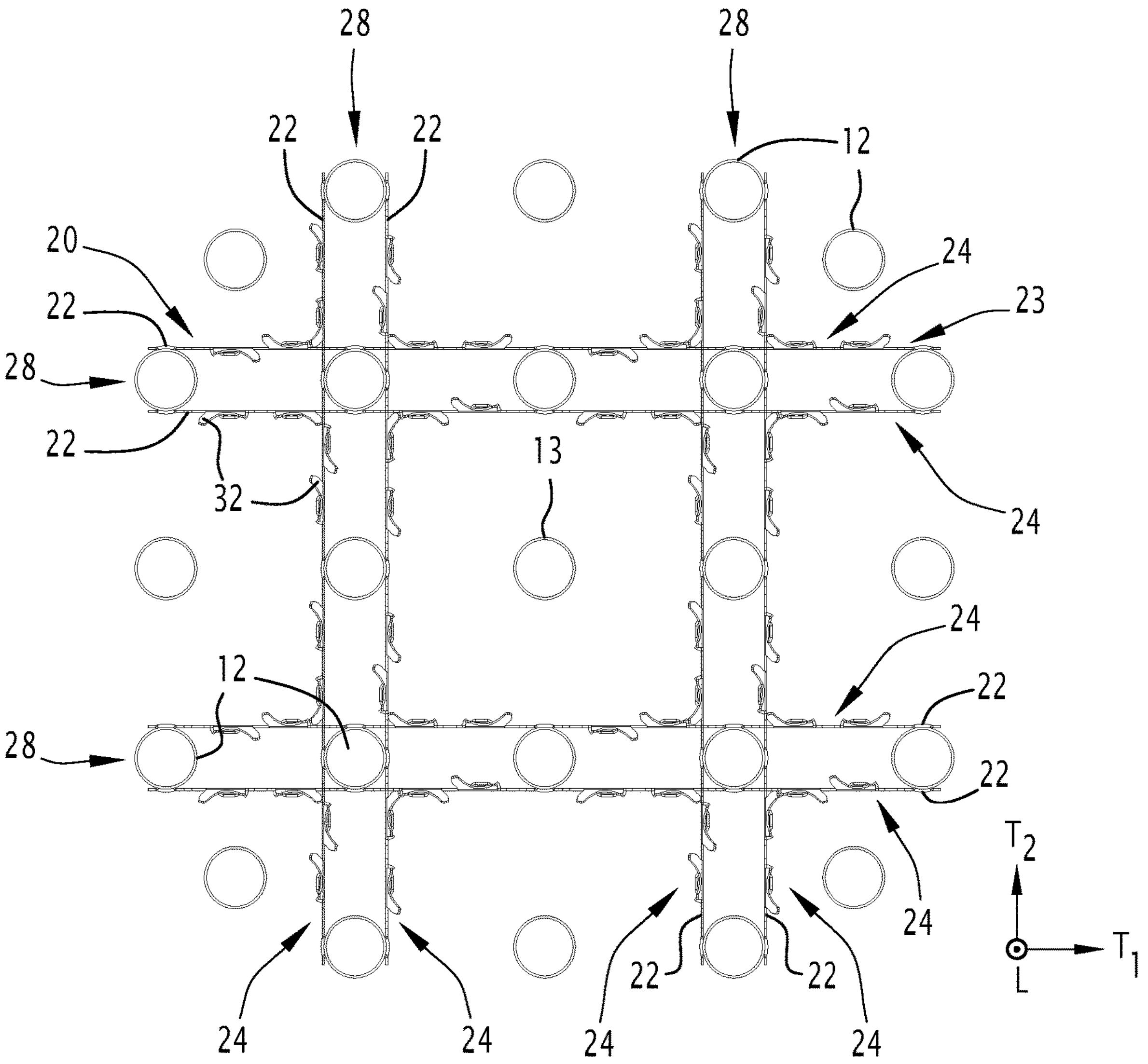
FIG. 4 is a top view of the guide tubes and the reinforcement device of FIG. 3.

In one exemplary embodiment, as illustrated in FIGS. 3 to 5, each reinforcement plate 22 has two branches 24 that are parallel to each other and spaced apart from one another along the longitudinal axis L.

The two parallel branches 24 extend for example perpendicularly to the guide tubes 12, i.e. perpendicular to the longitudinal axis L.

In a variant, a reinforcement plate 22 comprises two branches 24 that are parallel to each other but extending obliquely in relation to the longitudinal axis L, i.e. neither parallel to the longitudinal axis L nor perpendicular to the longitudinal axis L.

The reinforcement plate 22 comprises at least one connector link 26 extending between the two branches 24 with connecting the two branches 24 to each other.

The reinforcement plate 22 preferably comprises a plurality of connector links 26 distributed along the branches 24 and being spaced apart from each other along the branches 24.

In the example illustrated in FIGS. 3 and 5, the connector links 26 extend longitudinally, i.e. parallel to the longitudinal axis L. In a particular embodiment, each connector link 26 is located at a distance from the ends of at least one of the two branches 24, or even at a distance from the ends of each of the two branches 24, as in the example illustrated in FIGS. 3 and 5.

Preferably, at least one or each connector link 26 is disposed along the branches 24 so as to extend along one of the guide tubes 12 with which the reinforcement plate 22 is in contact. In the example illustrated, each connector link 26 extends along one of the guide tubes 12 with which the reinforcement plate 22 is in contact.

In the example illustrated in FIGS. 3 and 5, each reinforcement plate 22 comprises two connector links 26 spaced apart from one another and spaced apart from the ends of the two branches 24, each connector link 26 extending along one of the guide tubes 12 with which the reinforcement plate 22 is in contact.

In one variant that may be envisaged, the reinforcement plate 22 comprises a respective connector link 26 along each of the guide tubes 12 with which the reinforcement plate 22 is in contact.

Each reinforcement plate 22 is for example attached to an assembly 28 comprising a plurality of guide tubes 12, here a plurality of guide tubes 12 aligned in a direction of alignment perpendicular to the direction of extension of the guide tubes 12, that is to say perpendicular to the longitudinal axis L.

In the example illustrated in FIG. 3, the reinforcement plate 22 is attached to an assembly 28 comprising five guide tubes 12, and comprises two connector links 26 extending along the second guide tube 12 and the fourth guide tube 12 of the assembly 28.

Optionally, each reinforcement plate 22 includes an additional connector link 26 extending along the first guide tube 12 of the assembly 28, an additional connector link 26 extending along the third guide tube 12 of the assembly 28 and/or an additional connector link 26 extending along the fifth guide tube 12 of the assembly 28. These optional additional connector links 26 are shown in dash-dot lines in FIG. 3.

The reinforcement device 20 comprises, for example, intersecting reinforcement plates 22.

At least one reinforcement plate 22 extends along a first direction T1 and is attached to a first assembly 28, the guide tubes 12 of the first assembly 28 being aligned along the first direction T1, and at least one other reinforcement plate 22 extends along a second direction T2 making a non-zero angle with the first direction T1 and is attached to a second assembly 28, the guide tubes 12 of the second assembly 28 being aligned along the second direction T2. The second direction T2 is for example perpendicular to the first direction T1.

The reinforcement device 20 is for example formed of two sets of intersecting reinforcement plates 22, in particular a first set of reinforcement plates 22 that extend along the first direction T1, and intersect with a second set of reinforcement plates 22 that extend along the second direction T2.

In one exemplary embodiment, the reinforcement plates 22 intersect each other at a distance from the ends of their branches 24. The branches 24 of each reinforcement plate 22 have an end portion extending beyond the intersection with each other reinforcement plate 22 that is intersected by the reinforcement plate 22, the end portion being attached onto a guide tube 12.

Preferably and as illustrated in FIGS. 2 to 4, each end portion of a branch 24 does not extend beyond its zone of attachment on the corresponding guide tube 12.

In a variant, the end portions of at least one of the branches 24 of a reinforcement plate 22 extend beyond the peripheral layer of the nuclear fuel rods 4 and are attached to each other by a peripheral plate arranged around the nuclear fuel rod bundle 4.

In one exemplary embodiment, each reinforcement plate 22 that intersects another reinforcement plate 22 is attached to a guide tube 12 that is adjacent to this intersection, the said other reinforcement plate 22 also being attached to this guide tube 12.

The reinforcement plates 22 are for example arranged in pairs 23, the reinforcement plates 22 of each pair 23 being situated on either side of an assembly 28 of guide tubes 12 that are aligned in a manner such that the two reinforcement plates 22 are in contact with opposite surfaces of the guide tubes 12 of this assembly 28. The guide tubes 12 of the assembly 28 are sandwiched between the two reinforcement plates 22 of the pair 23.

The reinforcement device 20 comprises for example at least one pair 23 of reinforcement plates 22 that extend along the first direction T1, and intersect with at least one pair 23 of reinforcement plates 22 extending along the second direction T2, the two reinforcement plates 22 of each pair 23 being situated on either side of an assembly 28 of guide tubes 12 to which they are attached.

The reinforcement device 20 here comprises two pairs 23 of reinforcement plates 22 that extend along the first direction T1, and intersect with two pairs 23 of reinforcement plates 22 extending along the second direction T2.

Each pair 23 of reinforcement plates 22 that extend along the first direction T1 intersect each pair 23 of reinforcement plates 22 that extend along the second direction T2, forming a cell within which is accommodated a guide tube 12 on which each of the reinforcement plates 22 of these two pairs 23 is attached.

A plurality of distinct and separate guide tubes 12 are accommodated in the individual cells thus defined. These guide tubes 12 are four in number in FIG. 4.

Each pair 23 of reinforcement plates 22 that intersect another pair 23 of reinforcement plates 22 extends beyond this intersection by being in contact with a guide tube 12 located beyond this intersection, in particular attached to this guide tube 12.

The end portions of the one or more branch(es) 24 of each pair 23 of reinforcement plates 22 extend beyond the intersection with the reinforcement plates 22 of each other pair 23 of reinforcement plates 22.

The end portions of the one or more branch(es) 24 of each pair 23 of reinforcement plates 22 extending beyond the intersection with the reinforcement plates 22 of each other pair 23 of reinforcement plates 22 are preferably attached onto a guide tube 12.

Optionally, the end portions of the or at least one of the branches 24 of a first reinforcement plate 22 are attached by a transverse connector link 27 to the end portions of the one or more branch(es) 24 of a second reinforcement plate 22 of a pair 23. Such a transverse connector link 27 can be seen in FIG. 7.

Optionally, the said transverse connector link 27 is in contact with and preferably attached to the guide tube 12 so as to face the end portions of the branches 24 concerned. These attachments, when they exist, constitute the points of attachment 21 of the reinforcement plate 22 on the guide tubes 12 as described above and thereby the points of attachment 21 of the reinforcement device 20 on the guide tubes 12.

Figure 6:
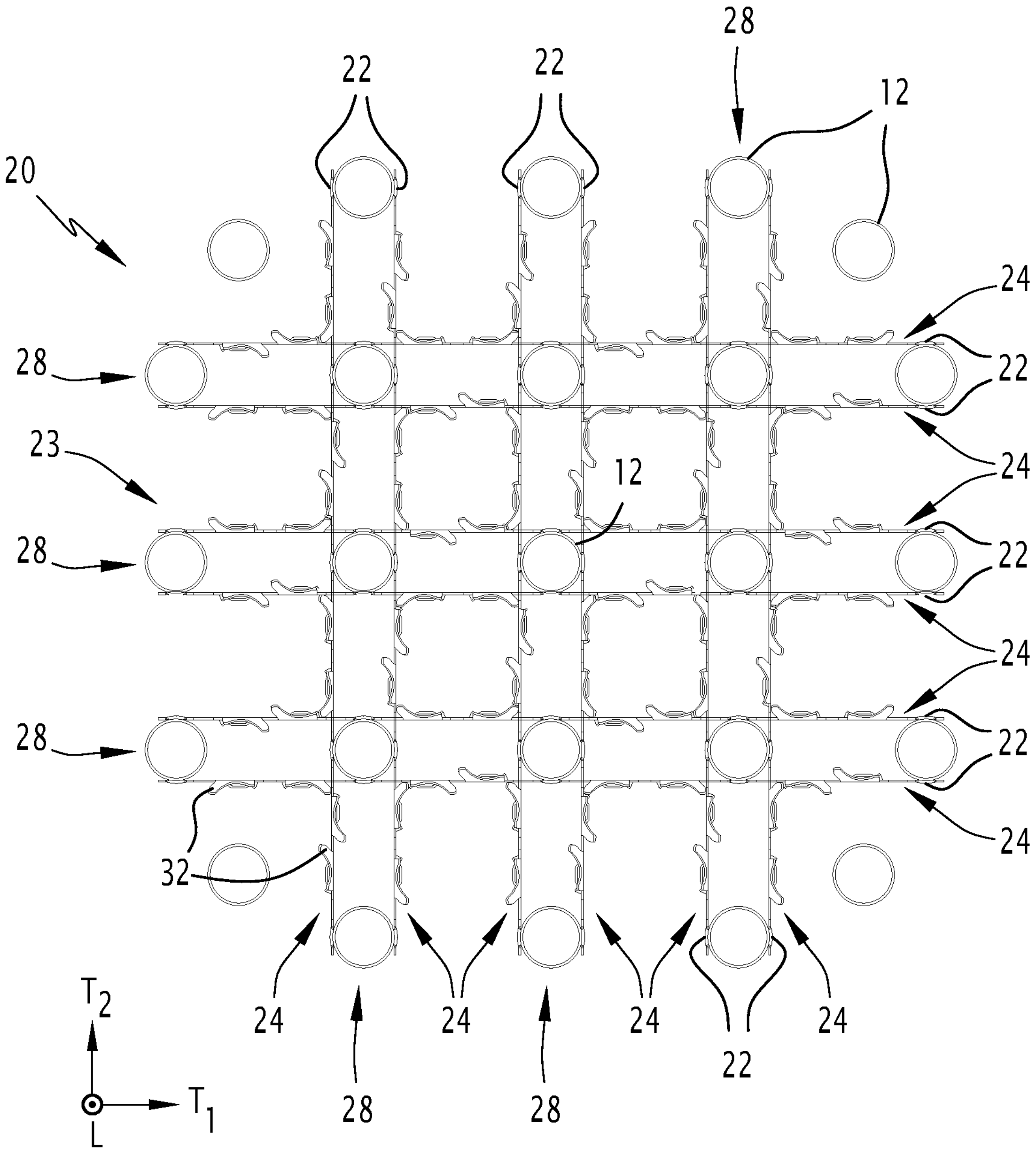
FIG. 6 is a top view of the guide tubes and of a reinforcement device according to a variant.

The number of pairs 23 of intersecting reinforcement plates 22 may vary. As illustrated in FIG. 6, the reinforcement device 20 may for example comprise three pairs 23 of reinforcement plates 22 extending along the first direction T1 and/or three pairs 23 of reinforcement plates 22 extending along the second direction T2.

In the example illustrated in FIG. 6, the reinforcement device 20 comprises three pairs 23 of reinforcement plates 22 that extend along the first direction T1, and intersect with three pairs 23 of reinforcement plates 22 extending along the second direction T2.

The number of pairs 23 of reinforcement plates 22 extending along the first direction T1 and the number of pairs 23 of reinforcement plates 22 extending along the second direction T2 may be different.

In a variant not shown, a reinforcement device 20 comprises three pairs 23 of reinforcement plates 22 that extend along the first direction T1, and intersect with two pairs 23 of reinforcement plates 22 extending along the second direction T2.

Preferably, the reinforcement plates 22 of the reinforcement device 20 are assembled to each other at their points of intersection.

The reinforcement device 20 is for example constituted of plates, which constitute in particular the branches 24, that are provided with slits obtained for example by stamping and are interlocked therebetween.

Preferably, the said plates are attached to one another at their junction, without any degree of freedom (secured fixing), for example by means of spot welding or cross-bracing or spider connection (attached ferrule) at the upper and/or lower edge of the plates and/or welded by bead weld over all or part of the height of the joint.

By way of a variant, all or part of the reinforcement device 20 can be produced by additive manufacturing.

Preferably all or part of the components of the reinforcement device 20 are configured to limit the pressure drop of the reinforcement device 20, for example by using plates whereof the lower edge is rounded or chamfered.

Optionally, each reinforcement plate 22 is provided on one of its edges with at least one attachment tab 30 projecting out from the said edge, each attachment tab 30 being attached to a guide tube 12. Each attachment tab 30 thus bears an attachment point 21.

Preferably, each reinforcement plate 22 is provided with at least one attachment tab 30 associated respectively with each guide tube 12 on which the reinforcement plate 22 is attached.

When the reinforcement plate 22 has a plurality of branches 24, each attachment tab 30 is disposed on an edge of a branch 24. One or more of the branches 24 of the reinforcement plate 22 may each be provided with one or more attachment tab(s) 30.

In the example illustrated in FIG. 3, each attachment tab 30 projects in the upward direction from the upper edge of the upper branch 24 of each reinforcement plate 22.

Optionally, at least one reinforcement plate 22, preferably each reinforcement plate 22, is provided with mixing means, for example in the form of mixing fins 32 and/or deflectors 34, configured for the mixing of the cooling fluid flowing between the nuclear fuel rods 4 during operation of the nuclear reactor.

The reinforcement plate 22 comprises, for example, mixing fins 32 located on an edge of the reinforcement plate 22, preferably an upper edge of the reinforcement plate 22.

When the reinforcement plate 22 has a plurality of branches 24, the mixing fins 32 are for example located on an edge of a branch 24 of the reinforcement plate 22, preferably an upper edge of an upper branch 24 of the reinforcement plate 22.

The mixing fins 32 are configured to promote the mixing of the cooling fluid flowing between the nuclear fuel rods 4 during operation of the nuclear reactor.

Each mixing fin 32 is preferably inclined relative to the reinforcement plate 22 in a manner so as to extend obliquely in the upward direction relative to the longitudinal axis L.

The reinforcement plate 22 is for example provided with deflectors 34 arranged on one edge of the reinforcement plate 22.

When the reinforcement plate 22 comprises a plurality of branches 24, the deflectors 34 are for example located on an edge, preferably the upper edge, of a branch 24, preferably the lower branch 24 of the reinforcement plate 22.

Each deflector 34 is for example produced so as to project outward from the said edge, in the form of a rectangular projection having at least one corner bent at its free end. By way of a variant, a deflector 34 is produced by slitting one edge of the reinforcement plate 22 and bending at least one of the corners disposed at the free end of the slit.

The deflectors 34 are configured to deflect the coolant fluid flowing between the nuclear fuel rods 4 during operation of the nuclear reactor.

Optionally, at least one reinforcement plate 22, preferably each reinforcement plate 22, is provided with movement limiters 36 configured to limit the movement of a nuclear fuel rod 4 that is adjacent to the reinforcement plate 22 and to avoid any further contact between the nuclear fuel rod 4 and the reinforcement device 20 and in particular any contact with the mixing means.

Each movement limiter 36 is for example in the form of a rigid projection forming a support for a nuclear fuel rod 4.

Each reinforcement plate 22 comprises, for example, movement limiters 36 projecting outward on one or on each of its two opposite surfaces.

When the reinforcement plate 22 has a plurality of branches 24, the movement limiters 36 are preferably arranged on at least one of the branches 24 of each reinforcement plate 22.

Figure 7:
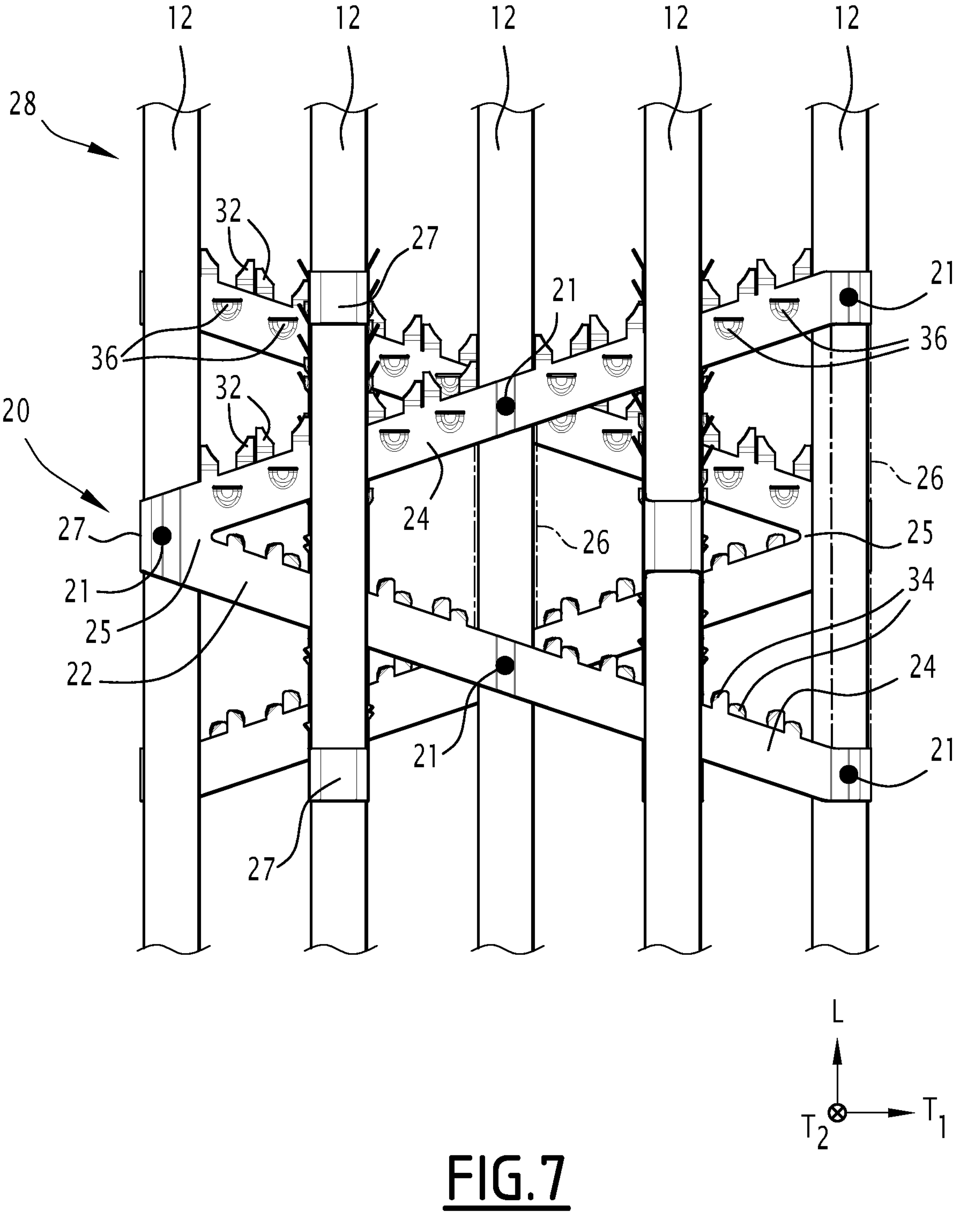
FIG. 7 is a side view illustrating the guide tubes and a reinforcement device of the nuclear fuel assembly of FIG. 1 according to a variant.
Figure 8:
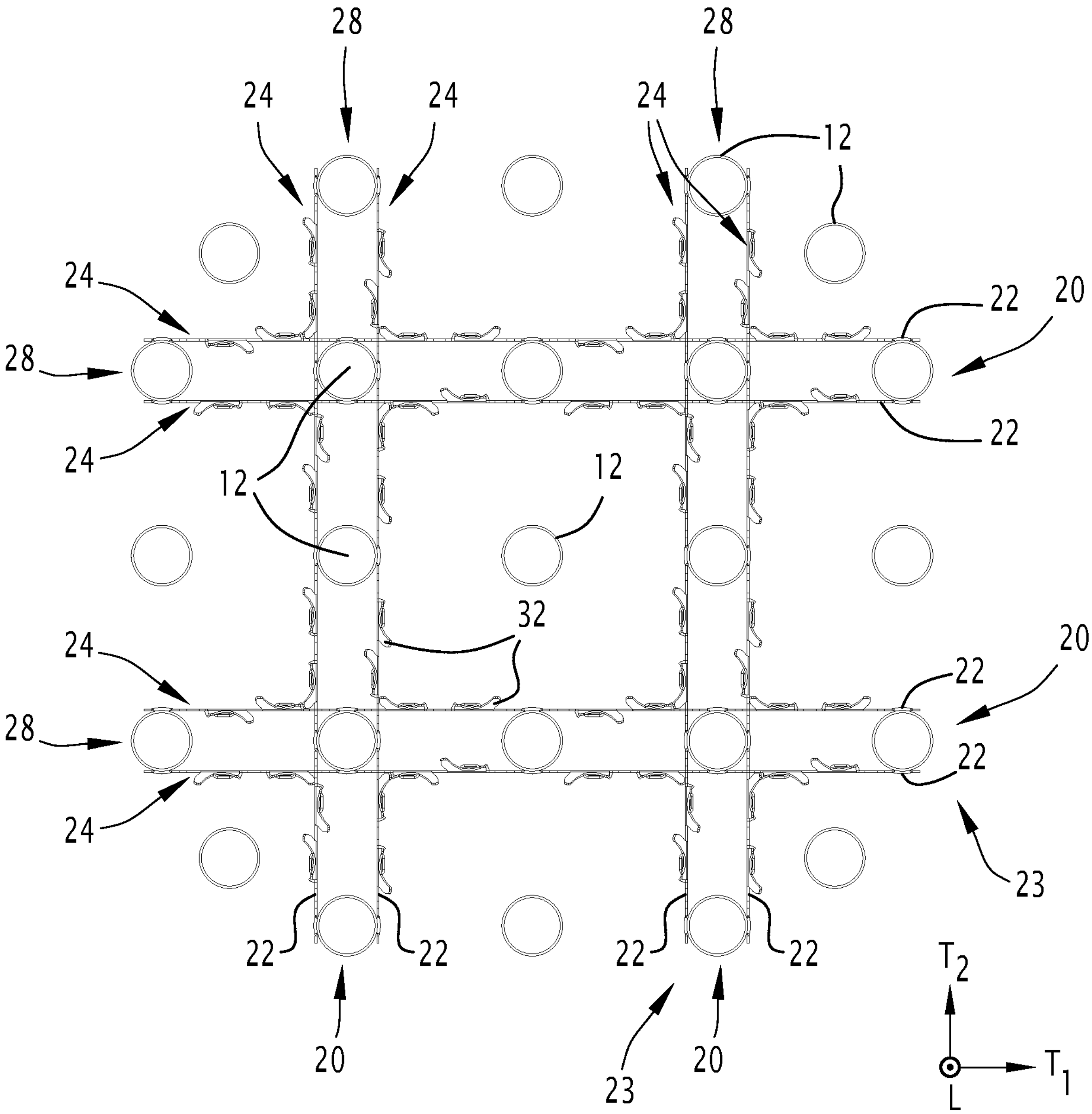
FIG. 8 is a top view of the guide tubes and the reinforcement device of FIG. 7.
Figure 9:
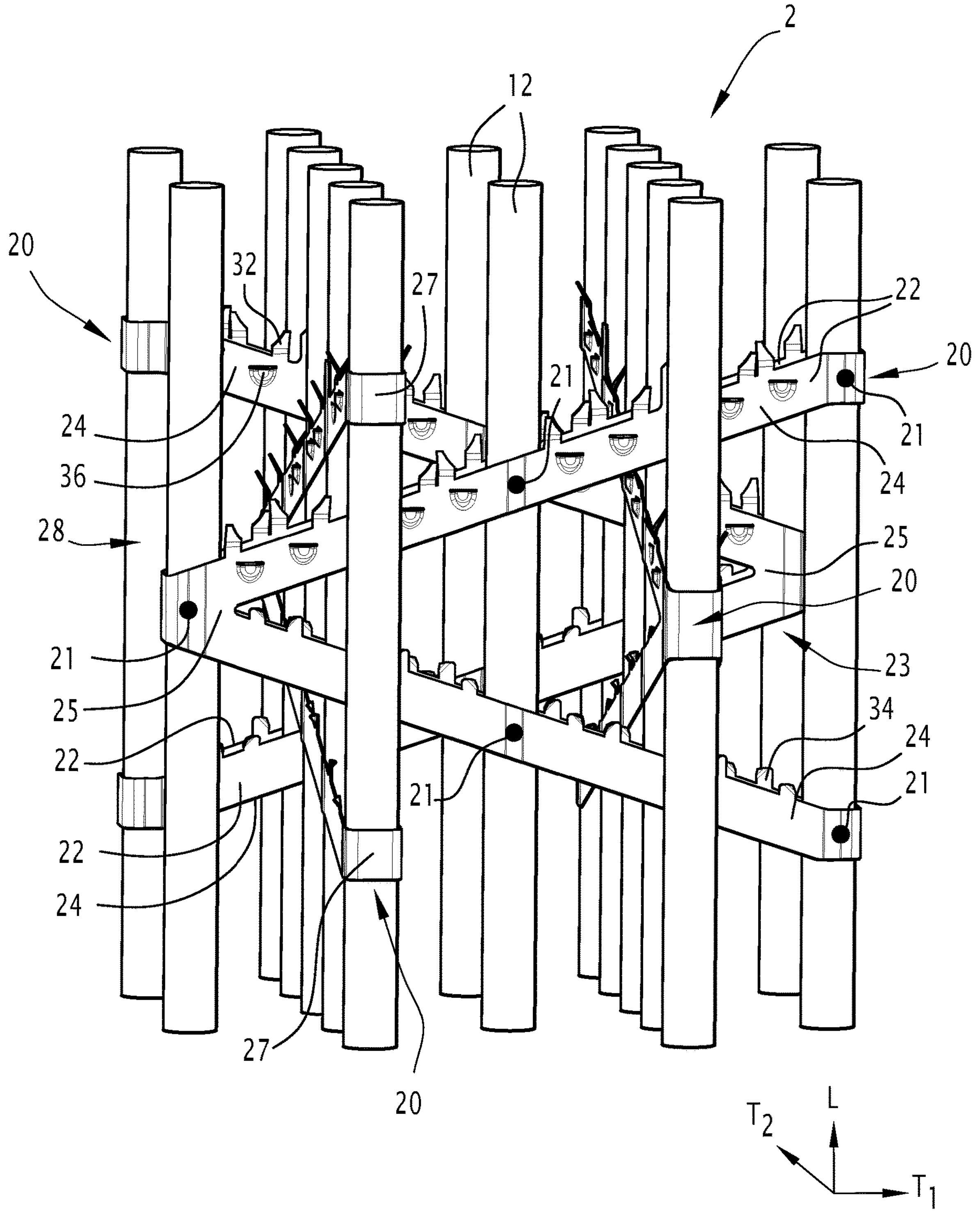
FIG. 9 is a perspective view of some of the guide tubes and the reinforcement device of FIGS. 7 and 8.

The embodiment shown in FIGS. 7 to 9 differs from the one shown in FIGS. 3 to 6 in that a reinforcement device 20 comprises at least one reinforcement plate 22 having at least two branches 24 joined at a junction 25, the branches 24 extending from the junction 25 away from each other.

The junction 25 is for example situated at one end of each of the branches 24. Thus, the branches 24 are joined at one of their ends and each then extends towards their opposite end, moving away from each other.

In the example illustrated in FIG. 7, each reinforcement plate 22 has a V-shaped form composed of two branches 24, with each branch 24 defining a respective branch of the V.

The reinforcement plate 22 is in contact with the guide tubes 12 by being attached to the guide tubes 12 at least at two attachment points 21 offset along the longitudinal axis L.

In one exemplary embodiment, the reinforcement plate 22 is attached onto at least one of the guide tubes 12 at two attachment points 21 spaced apart along this guide tube 12, each of these two attachment points 21 being situated on a respective branch 24.

In one exemplary embodiment, at least one of the branches 24 is attached to two guide tubes 12 at two attachment points 21 offset relative to each other along the longitudinal axis L.

In one exemplary embodiment, the reinforcement plate 22 is attached to guide tubes 12, each branch 24 preferably being attached to at least one guide tube 12 at attachment points 21 spaced apart along this guide tube 12.

Preferably, the reinforcement plate 22 is attached on a guide tube 12 at the junction 25 between the branches 24. An attachment point 21 of the reinforcement plate 22 is located at the junction 25 between the branches 24.

The reinforcement plate 22 is here attached to a guide tube 12 at the junction 25 between the branches 24, the branches 24 being attached to a plurality of other guide tubes 12 with being spaced apart along each of these other guide tubes 12 along the longitudinal axis L.

Traversing across the branches 24 from the junction 25 to the opposite ends of the branches 24, the branches 24 are attached onto a plurality of guide tubes 12, while running progressively away from each other. Preferably, the spacing distance between the branches 24 increases between each guide tube 12 and the subsequent one along the branches 24.

Optionally, each reinforcement plate 22 can be provided with one or more attachment tabs 30, mixing fins 32, deflectors 34 and/or movement limiters 36 on one or more of the branches 24 of the reinforcement plate 22, in a manner analogous to that already described with reference to FIGS. 2 to 5.

Preferably, each reinforcement device 20 is formed of a pair 23 of reinforcement plates 22 in contact with opposite surfaces of guide tubes 12, these guide tubes 12 thus being accommodated between the two reinforcement plates 22 of the pair 23.

Preferably, the two reinforcement plates 22 of a pair 23 are also attached to each other at least at one of their ends and preferably at each of their ends by transverse connector links 27 that are perpendicular to the longitudinal axis L.

As illustrated in FIG. 7, the two reinforcement plates 22 of a pair 23 are similar in shape and form, and are mutually superimposed in a view perpendicular to the longitudinal axis L.

Each branch 24 of one of the two reinforcement plates 22 of a pair 23 extends along an associated branch 24 of the other reinforcement plate 22 of the pair 23 to together form one branch of the reinforcement device 20.

Thus, in the example illustrated, just like the two reinforcement plates 22 of which it is composed, the reinforcement device 20 has a general V shaped form, each branch of which is formed by two corresponding branches 24 of the two reinforcement plates 22 of the reinforcement device 20.

It is possible to attach a plurality of reinforcement devices 20 of this type at the same level along the guide tubes 12, the reinforcement devices 20 being intermingled with one another.

For example, a first reinforcement device 20 is attached to a first assembly 28 of guide tubes 12 aligned along a first direction T1 and a second reinforcement device 20 is attached to a second assembly 28 of guide tubes 12 aligned along a second direction T2 forming a non-zero angle with the first direction T1, with one guide tube 12 being common to the first assembly 28 of guide tubes 12 and to the second assembly 28 of guide tubes 12, the two branches 24 of each reinforcement plate 22 of the first reinforcement device 20 being attached to this common guide tube 12 at attachment points 21 located between the attachment points 21 of the two branches 24 of each reinforcement plate 22 of the second reinforcement device 20.

The two branches 24 of each reinforcement plate 22 of the first reinforcement device 20 are for example attached at attachment points 21 that are distanced away from each other along the guide tube 12 that is common to the first assembly 28 of guide tubes. 12 and the second assembly 28 of guide tubes 12.

The nuclear fuel assembly 2 comprises for example a pair of first reinforcement devices 20 extending along the first direction T1 and a pair of second reinforcement devices 20 extending along the second direction T2, the reinforcement devices 20 being arranged such that the branches 24 of each reinforcement plate 22 of each first reinforcement device 20 pass between the branches 24 of each reinforcement plate 22 of one of the second reinforcement devices 20 and on either side of the branches 24 of each reinforcement plate 22 of the other of the second reinforcement devices 20.

The two reinforcement devices 20 of each pair of reinforcement devices 20 are preferably arranged head-to-tail: the branches 24 of each reinforcement plate 22 of one device move away in one direction along the direction of extension of the two reinforcement devices 20 (first direction T1 or second direction T2), and the branches 24 of each reinforcement plate 22 move away from one another in the other direction along the direction of extension of the two reinforcement devices 20.

In the embodiments shown in FIGS. 2 to 5 and FIGS. 7 and 9, each reinforcement plate 22 comprises a plurality of branches 24, in particular two parallel branches 24 connected by connector links 26 or two non-parallel branches 24 that are joined at a junction 25.

Other embodiments are conceivable.

Figure 10:
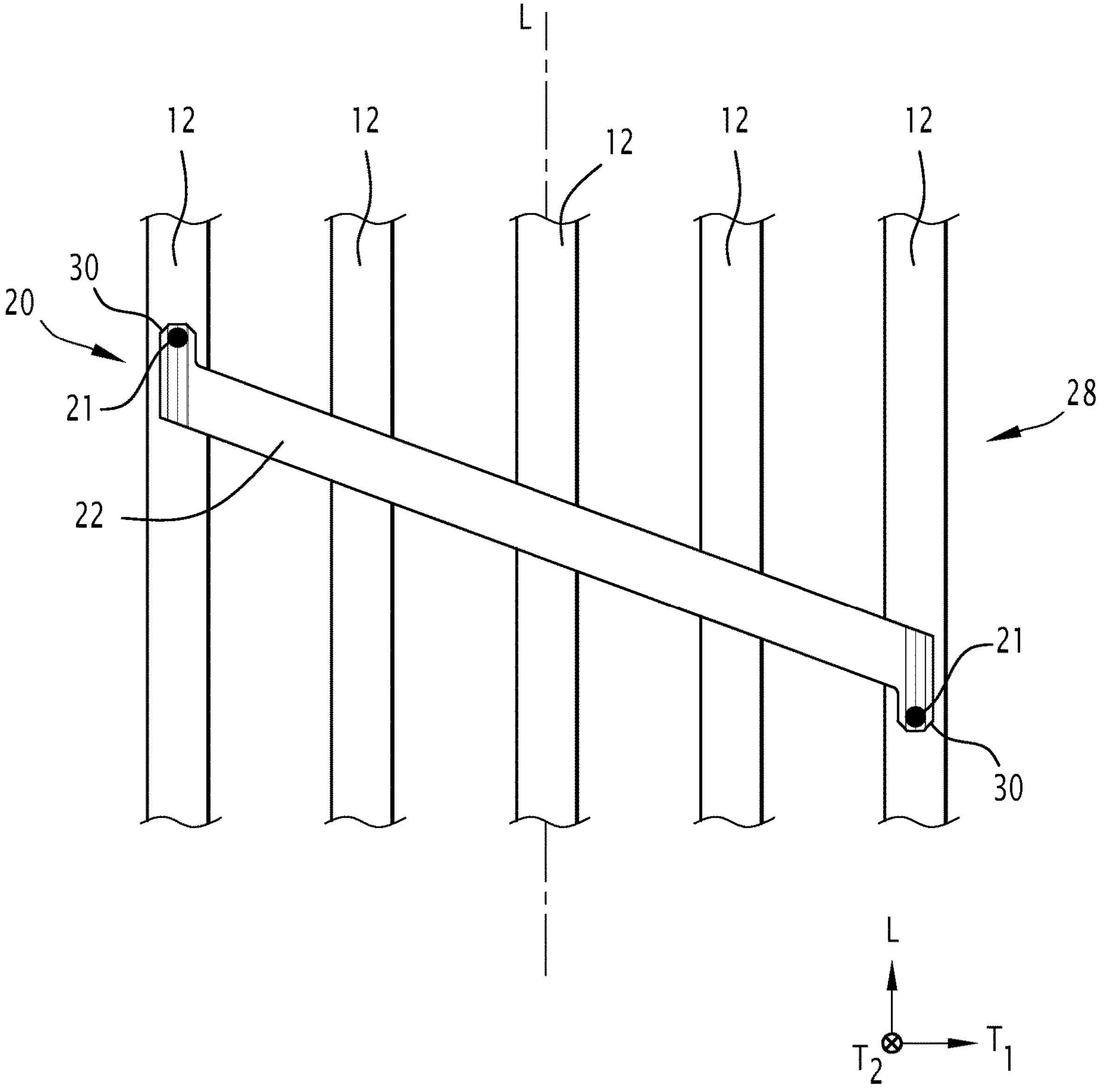
FIGS. 10 to 12 are side views illustrating each of the guide tubes and a reinforcement device according to some variants.

In one exemplary embodiment illustrated in FIG. 10, a reinforcement device 20 comprises a reinforcement plate 22 in the form of a single strip or single branch 24, in contact with a plurality of guide tubes 12.

The reinforcement plate 22 is attached to these guide tubes 12 at attachment points 21 including at least two attachment points 21 that are offset along the longitudinal axis L.

As illustrated in FIG. 10, the reinforcement plate 22 comprises for example two attachment tabs 30, one located on an upper edge of the reinforcement plate 22 and the other located on a lower edge of the reinforcement plate 22. This serves as the means to ensure the longitudinal offset of the attachment points 21 borne by these attachment tabs 30.

The two attachment tabs 30 are located at both ends of the reinforcement plate 22, each attachment tab 30 being located at a respective end of the reinforcement plate 22. In a variant, one or each of the two attachment tabs 30 is located at a distance from the ends of the reinforcement plate 22. In one particular variant, one attachment tab 30 is located at one end of the reinforcement plate 22, with the other attachment tab 30 being closer to the other end of the reinforcement plate 22 while being at a distance from the said former end.

In the example illustrated, each of the two attachment tabs 30 is used for the attachment of the reinforcement plate 22 onto a respective guide tube 12 located at one end of the assembly 28 of aligned guide tubes 12 with which the reinforcement plate 22 is in contact. In a variant, one or each of the two attachment tabs 30 is used for the attachment onto an intermediate guide tube 12, of the alignment of guide tubes 12 with which the reinforcement plate 22 is in contact. In one particular variant, one of the two attachment tabs 30 is used for the attachment onto an end guide tube 12, and the other attachment tab 30 is used for the attachment of an intermediate guide tube 12.

In some variants, the reinforcement plate 22 may include other attachment tabs 30.

As illustrated in FIG. 10, in one exemplary embodiment, the reinforcement plate 22 is inclined such that it extends obliquely in relation to the longitudinal axis L. Thus, the reinforcement plate 22 is in contact with the guide tubes 12 in contact zones that are offset relative to each other along the longitudinal axis L.

This makes it possible to ensure the longitudinal offset of the points of attachment 21 of the reinforcement plate 22 on the various guide tubes 12.

Such an inclination increases the longitudinal offset between two attachment tabs 30 provided on an upper edge and a lower edge of the reinforcement plate 22, at locations spaced apart along the reinforcement plate 22.

Such an inclination serves to enable a longitudinal offset between two attachment points on two distinct and separate guide tubes 12, including when the attachment points are provided on the reinforcement plate 22, between the upper edge and the lower edge of the reinforcement plate 22, or on attachment tabs 30 located on the same edge of the reinforcement plate 22, for example the upper edge.

Thus, in a variant, as illustrated in dotted lines in FIG. 10, the reinforcement plate 22 is inclined so as to extend obliquely in relation to the longitudinal axis L and is attached onto two distinct and separate guide tubes 12 at two attachment points 21 that are offset longitudinally, the two attachment points 21 being located between the upper edge and the lower edge of the reinforcement plate 22, or on attachment tabs 30 located on the same edge of the reinforcement plate 22, preferably the upper edge.

These considerations may also apply to at least one branch 24 of a reinforcement plate 22 comprising a plurality of branches 24.

Figure 11:
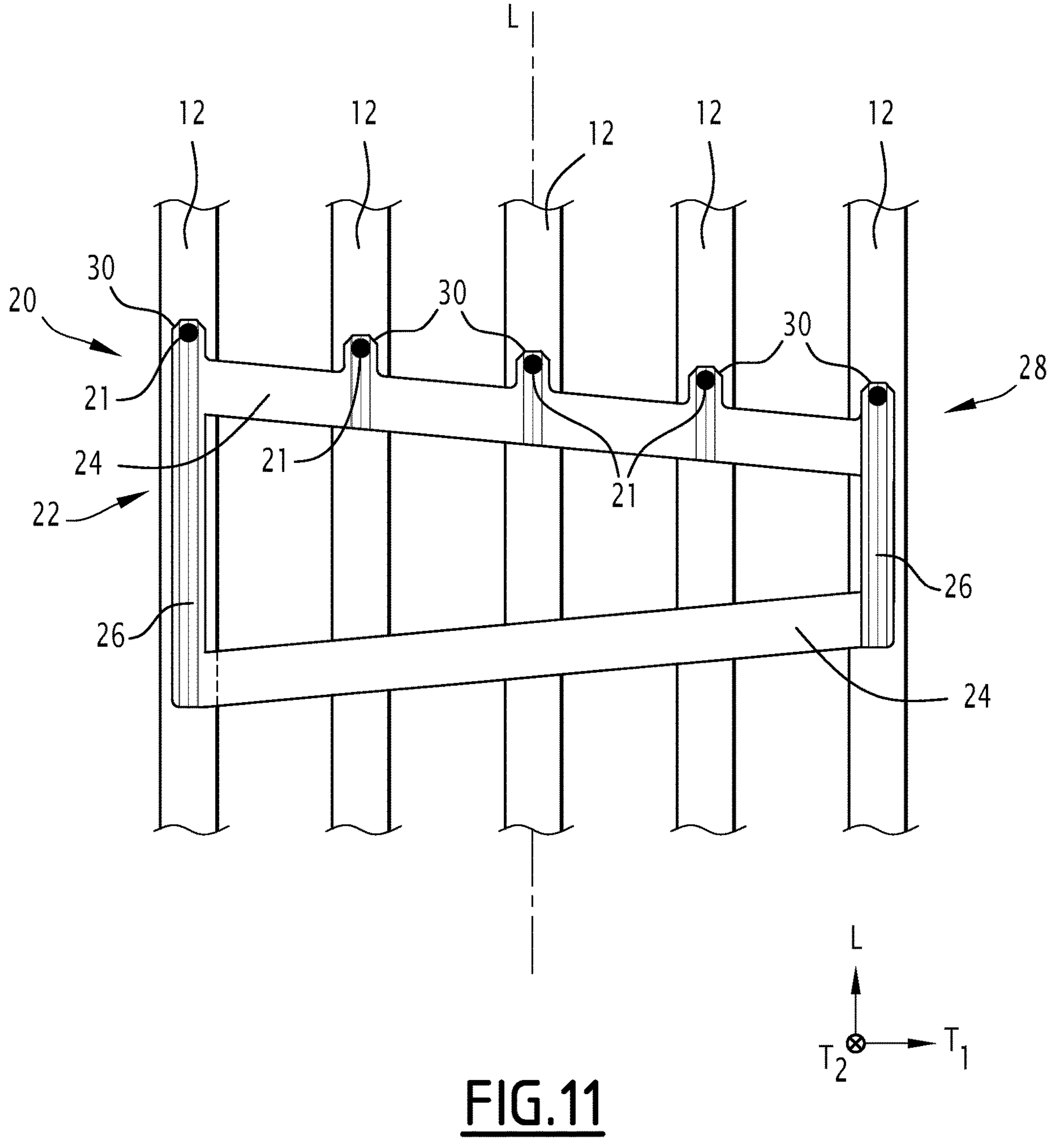

Thus, as illustrated in FIG. 11, a reinforcement plate 22 comprises two branches 24 including at least one branch 24, here the upper branch 24, that is inclined so as to be oblique in relation to the longitudinal axis L, being attached to the guide tubes 12 at attachment points 21 offset longitudinally due to the inclination of the branch 24.

These attachment points 21 are here arranged on attachment tabs 30 located on an upper edge of this branch 24, and could by way of a variant be located on the branch 24, between its upper edge and its lower edge; or the attachment tabs 30 could be arranged entirely or partly on a lower edge of the branch 24.

Furthermore, in the examples illustrated in FIGS. 3 to 5 and FIGS. 7 to 9, a reinforcement plate 22 comprises parallel branches 24 connected by connector links 26 or branches 24 that are joined at a junction 25.

As illustrated in FIG. 11, in one exemplary embodiment, a reinforcement plate 22 comprises non-parallel branches 24 spaced apart longitudinally from one another, and connected by at least one connector link 26.

In addition, in the examples illustrated in FIGS. 3 to 5 and FIGS. 7 to 9, a reinforcement plate 22 comprises two branches 24, each branch 24 being attached to one or more guide tubes 12.

As illustrated in FIG. 11, in one exemplary embodiment, a reinforcement plate 22 comprises two distinct and separate branches 24 that are in contact with guide tubes 12, with only one of the two branches 24 being provided with points of attachment 21 on one or more of the guide tubes 12, the other branch 24 having no attachment points 21. This other branch 24 is merely in contact with the guide tubes 12.

In FIG. 11, the upper branch 24 is provided with attachment points 21, and the other lower branch 24 has no attachment points 21.

In the embodiment shown in FIGS. 3 to 5, a reinforcement plate 22 comprises two branches 24 spaced apart and connected by connector links 26.

Figure 12:
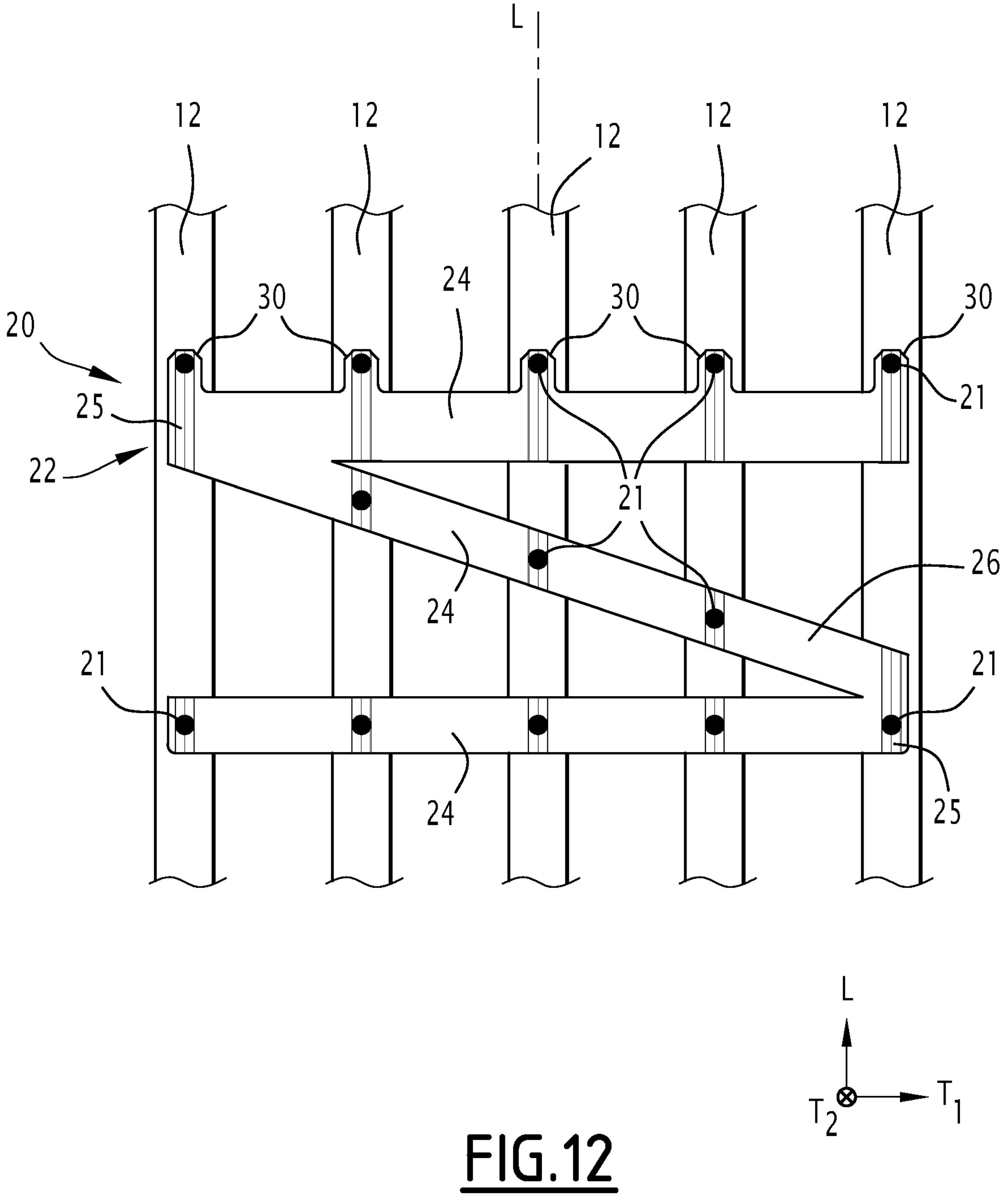

In one exemplary embodiment, as illustrated in FIG. 12, a reinforcement plate 22 comprises an upper branch 24 and a lower branch 24 connected to each other by an intermediate branch 24. The intermediate branch 24 is in contact with a plurality of guide tubes 12. The intermediate branch 24 is for example provided with attachment points that are offset longitudinally.

In the example illustrated, the upper branch 24 and the lower branch 24 are parallel, the intermediate branch 24 extends obliquely between the upper branch 24 and the lower branch 24.

The upper branch 24 and the lower branch 24 here extend perpendicularly relative to the longitudinal axis L, with the intermediate branch 24 extending obliquely.

In some variants, the inclinations of the branches 24 between themselves and in relation to the longitudinal axis L may be different.

The upper branch 24 is here provided with attachment points 21 located on attachment tabs 30 arranged on the upper edge of the upper branch 24, with the intermediate branch 24 and the lower branch 24 being provided with attachment points 21 located on each of them, between its lower edge and its upper edge.

As for the previous embodiments, in some variants, the attachment points 21 are provided on only one of the branches 24 or only a part the branches 24, and on each branch 24 provided with attachment points 21, the attachment points 21 may be arranged differently on attachment tabs 30 and/or on the branch 24, the preceding considerations as to the positions of the attachment points 21 being applicable to each branch 24.

Optionally, each reinforcement plate 22 illustrated in FIGS. 10 to 12 may be provided with one or more attachment tabs 30, mixing fins 32, deflectors 34 and/or motion limiters 36 on one or more of their branches 24, in a manner analogous to that already described with reference to FIGS. 2 to 5.

Furthermore, a single reinforcement plate 22 has been described with reference to each of FIGS. 10 to 12, however the reinforcement device 20 may quite obviously comprise one or more pairs 23 of analogous reinforcement plates 22 that sandwich the guide tubes 12 and/or other reinforcement plates 22 intersecting with the reinforcement plate 22.

Furthermore, in the example illustrated in FIG. 2, the reinforcement device 20 comprises reinforcement plates 22 that are in contact with assemblies 28 of guide tubes 12 aligned along directions which are perpendicular to the lateral surfaces of the nuclear fuel assembly 2, which are formed by rows of nuclear fuel rods 4 peripheral to the nuclear fuel assembly 2.

In a variant, a reinforcement device 20 comprises at least one reinforcement plate 22 in contact with an assembly 28 of guide tubes 12 aligned along a direction of oblique alignment in relation to each lateral surface of the nuclear fuel assembly 2.

Figure 13:
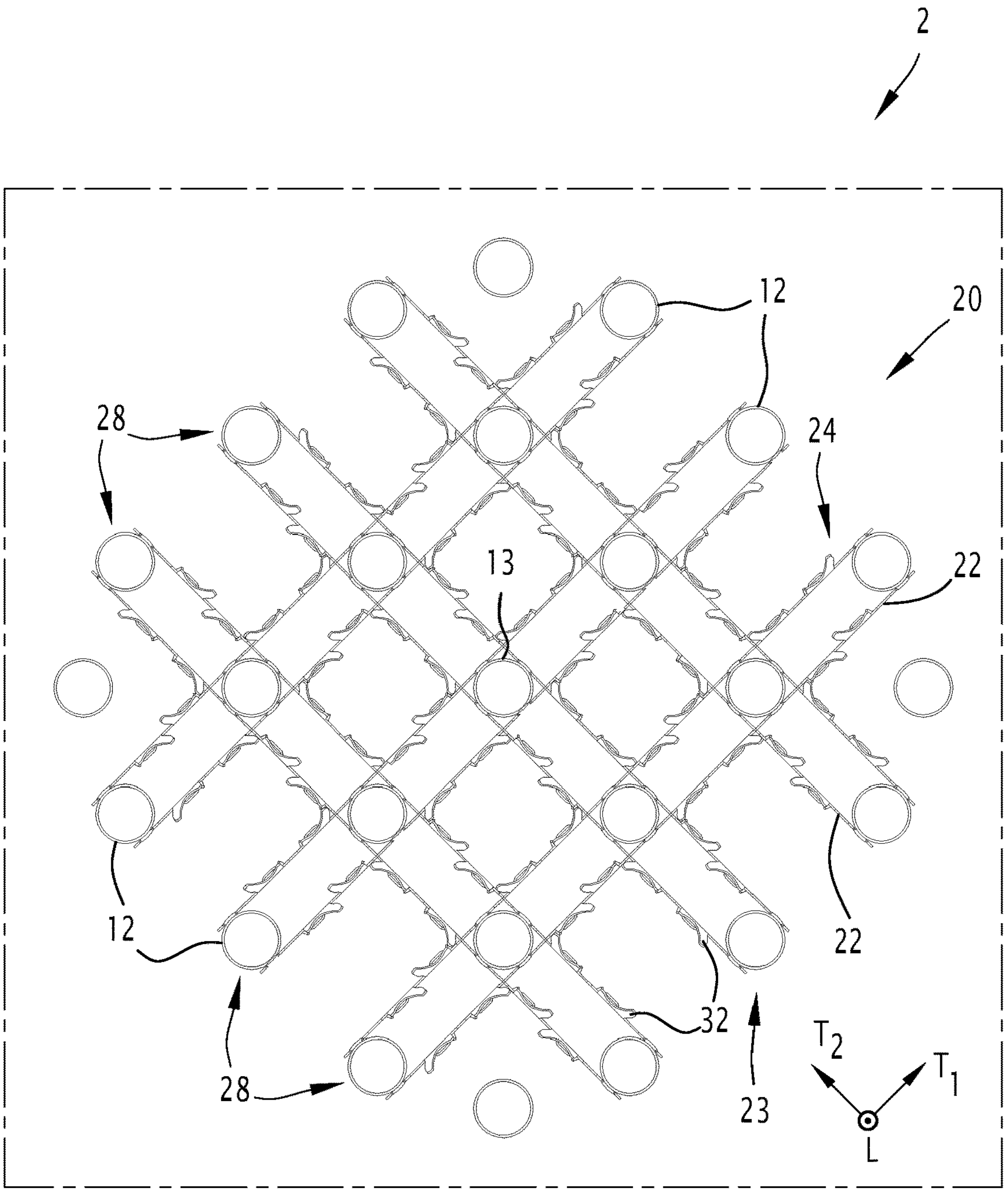
FIG. 13 is a top view illustrating the guide tubes and a reinforcement device according to a variant.

As illustrated in FIG. 13, in which the lateral surfaces of the nuclear fuel assembly 2 are graphically represented by dash-dot lines, in one exemplary embodiment, the reinforcement device 20 comprises at least one reinforcement plate 22 in contact with an assembly 28 of guide tubes 12 which are aligned along a first direction T1 that is oblique in relation to each lateral surface of the nuclear fuel assembly 2, and at least one reinforcement plate 22 in contact with an assembly 28 of guide tubes 12 which are aligned along a second direction T2 that is oblique in relation to each lateral surface of the nuclear fuel assembly 2, the first direction T1 and the second direction T2 forming a non-zero angle therebetween, with the first direction T1 and the second direction T2 in particular being perpendicular to each other.

Furthermore, and as illustrated in FIG. 13, in one exemplary embodiment, a reinforcement device 20 comprising intersecting reinforcement plates 22 comprises reinforcement plates 22, in particular four reinforcement plates 22, which intersect each other, defining an individual cell for through-passage of an instrumentation tube 13. One or more attachment points 21 of one or more reinforcement plates 22 defining this individual cell is (are) for example located on the instrumentation tube 13.

Thanks to the present disclosure, each reinforcement device 20 comprising at least one reinforcement plate 22 that is in contact with a plurality of guide tubes 12 and attached onto at least one of the guide tubes 12 at attachment points 21 that are offset along the longitudinal axis L makes it possible to link the guide tubes 12 with satisfactory rigidity due to the offset of the attachment points 21.

The reinforcement device can thus be produced with reinforcement plates using little material, which makes it possible to reduce its cost and to limit the impact of the reinforcement device on the neutron performance of the fuel assembly and/or the flow resistance to a coolant fluid flowing through the nuclear fuel assembly.

The reinforcement device has been described with reference to a nuclear fuel assembly for a pressurised water reactor with square cross-section. The guide tubes of such assemblies are arranged in a substantially rectilinear manner in the transverse direction and the reinforcement plates extend perpendicularly to the guide tubes in a substantially rectilinear fashion.

The implementation of the reinforcement device on a nuclear fuel assembly for a pressurised water nuclear reactor having hexagonal cross-section in which the guide tubes are not arranged in a rectilinear manner in the transverse direction may be carried out in a similar manner using reinforcement plates having appropriate geometry that is adapted so as to ensure contact of the reinforcement plates with an assembly of guide tubes.

What is claimed is:

1. A nuclear fuel assembly comprising:
nuclear fuel rods extending along a longitudinal axis;
a support skeleton configured to bear the nuclear fuel rods, the support skeleton comprising:
two end pieces spaced apart along the longitudinal axis;
a plurality of guide tubes extending along the longitudinal axis and connecting the two end pieces to each other;
spacer grids distributed between the two end pieces and attached onto the guide tubes, each spacer grid supporting the nuclear fuel rods; and
a reinforcement device, the reinforcement device comprising a first reinforcement plate and a second reinforcement plate extending parallel to the first reinforcement plate, the first reinforcement plate and the second reinforcement plate each being in contact with at least two of the guide tubes, the first reinforcement plate being attached to one or more of the at least two guide tubes at attachment points, the attachment points including a first attachment point and a second attachment point that are offset relative to each other along the longitudinal axis, the first attachment point and the second attachment point being attached to a first guide tube of the at least two guide tubes and being spaced apart along the first guide tube along the longitudinal axis,
the first reinforcement plate includes a first branch and a second branch that are vertically spaced apart from one another along the longitudinal axis, the first branch being in contact with the first guide tube at the first attachment point, the second branch being in contact with the first guide tube at the second attachment point,
the first and second branches are connected to each other by a first connector link extending vertically from the first branch to the second branch,
the first connector link comprises a flat plate extending vertically from the first branch to the second branch.

2. The nuclear fuel assembly according to claim 1, wherein the first and second reinforcement plates are each attached to each of the at least two of the guide tubes with which the first and second reinforcement plates are in contact.

3. The nuclear fuel assembly according to claim 1, wherein the first and second reinforcement plates are each attached to only some of the at least two of the guide tubes with which the first and second reinforcement plates are in contact.

4. The nuclear fuel assembly according to claim 1, wherein each of the first branch and the second branch of the first reinforcement plate has a first end and a second end, the first end of the first branch and the first end of the second branch being attached to a second guide tube of the at least two guide tubes, the second end of the first branch and the second end of the second branch being attached to a third guide tube of the at least two guide tubes.

5. The nuclear fuel assembly according to claim 1, wherein the first and second branches of the first reinforcement plate extend parallel to each other with the first branch being vertically above the second branch.

6. The nuclear fuel assembly according to claim 1, wherein the first and second branches of the first reinforcement plate extend perpendicularly relative to the longitudinal axis.

7. The nuclear fuel assembly according to claim 1, wherein the first and second branches are further joined at a junction, each of the first and second branches extending from the junction away from the other branch.

8. The nuclear fuel assembly according to claim 7, wherein the first and second branches of the first reinforcement plate are joined at one of their ends and spaced apart at another of their ends.

9. The nuclear fuel assembly according to claim 7, wherein one or each of the first and second branches of the first reinforcement plate extends obliquely in relation to the longitudinal axis.

10. The nuclear fuel assembly according to claim 1, wherein the first reinforcement plate and the second reinforcement plate forming a pair of reinforcement plates arranged on either side of each of the at least two guide tubes with which the pair of reinforcement plates are in contact.

11. The nuclear fuel assembly according to claim 10, wherein the reinforcement device comprises a plurality of the pairs of reinforcement plates, the pairs of reinforcement plates intersecting each other.

12. The nuclear fuel assembly according to claim 1, wherein the reinforcement device comprises a plurality of the reinforcement plates comprising the first and second reinforcement plates, the reinforcement plates of the plurality of the reinforcement plates intersecting each other.

13. The nuclear fuel assembly according to claim 1, wherein the first reinforcement plate is provided with at least one mixing fin and/or at least one deflector and/or at least one movement limiter.

14. The nuclear fuel assembly according to claim 1, wherein each of the attachment points between the first reinforcement plate and the one or more of the at least two of the guide tubes is produced by plastic deformation.

15. The nuclear fuel assembly according to claim 14, wherein the plastic deformation is by crimping, expansion, welding and/or brazing.

16. The nuclear fuel assembly according to claim 1, wherein the first connector link extends vertically along the first guide tube.

17. The nuclear fuel assembly according to claim 1, wherein the first and second branches are connected by a second connector link extending vertically from the first branch to the second branch, the second connector link being horizontally offset from the first connector link,
the attachment points including a third attachment point and a fourth attachment point attached to a second guide tube of the at least two guide tubes,
the third attachment point and the fourth attachment point being offset relative to each other along the longitudinal axis,
the second connector link is positioned between the third attachment point and the fourth attachment point.

* * * * *